Sept. 24, 1968   C. J. O'NEILL   3,402,911
LOADING BALANCER
Filed Oct. 6, 1966   2 Sheets-Sheet 1
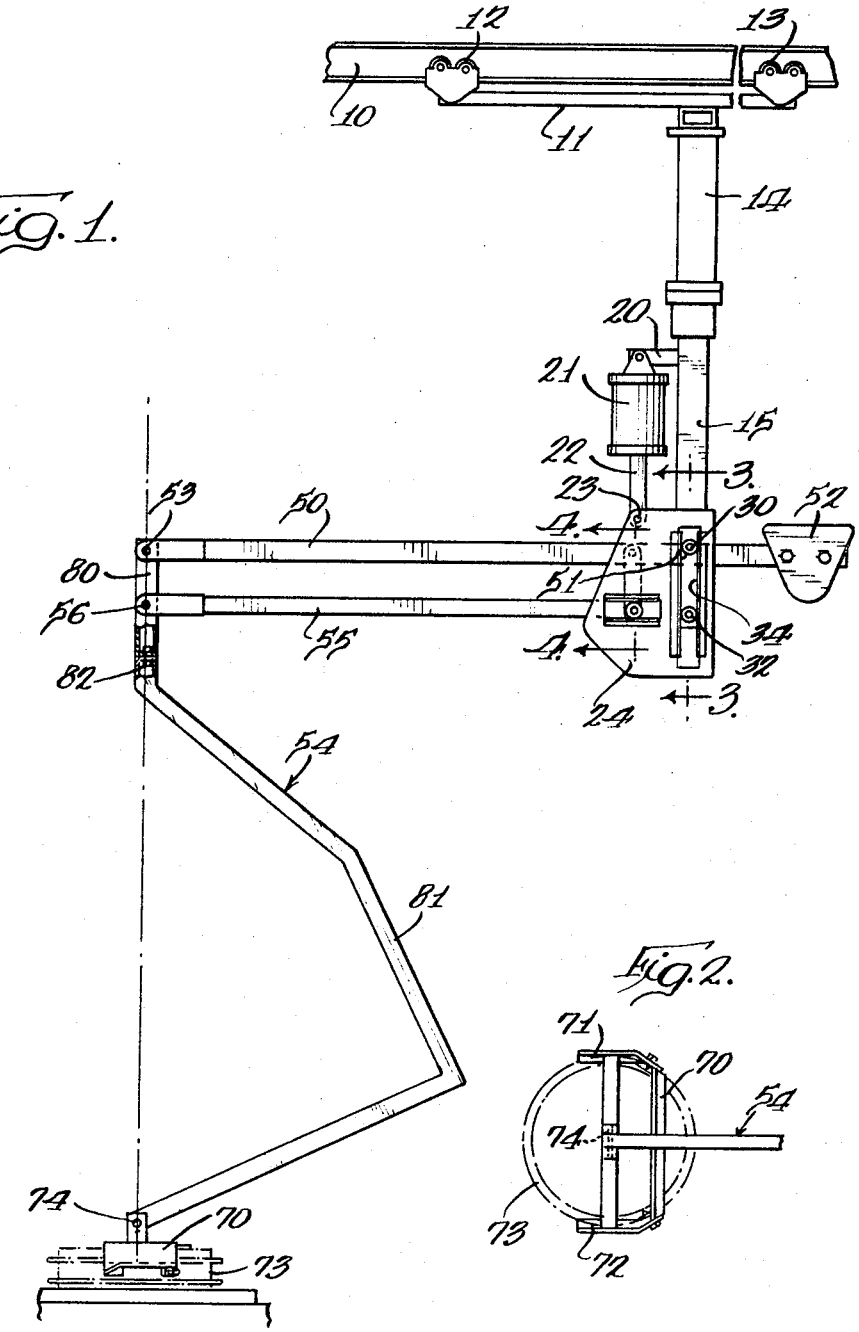
Inventor:
Charles J. O'Neill
By Hofgren, Wegner,
Allen, Stellman & McCord Att'ys

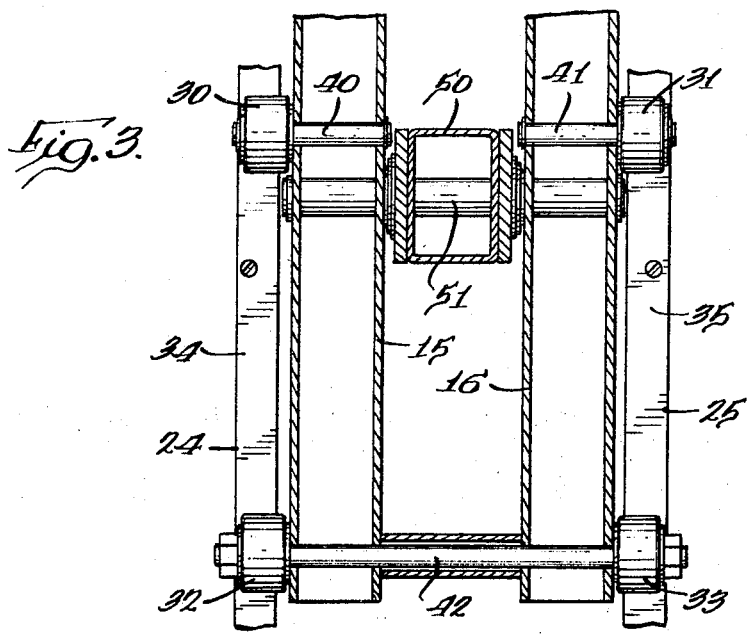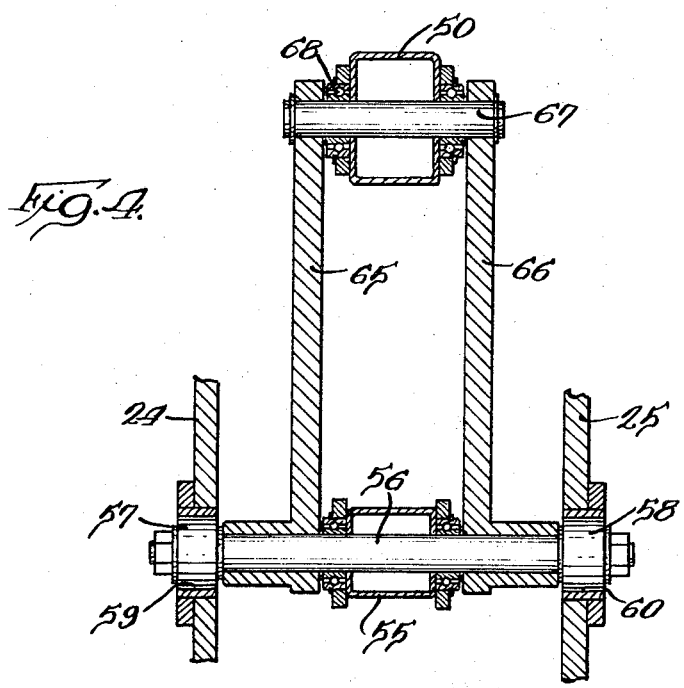

United States Patent Office 3,402,911
Patented Sept. 24, 1968

3,402,911
LOADING BALANCER
Charles J. O'Neill, Mendota, Ill., assignor to Conco
Engineering Works, Inc., a corporation of Illinois
Filed Oct. 6, 1966, Ser. No. 584,917
1 Claim. (Cl. 248—325)

ABSTRACT OF THE DISCLOSURE

A loading balancer having a multi-arm system and associated structure for balancing a load connected to one of said arms. Power mechanism is connected to another of said arms and includes a fluid-actuated piston and with the arms supporting the load having a bend therein and a swivel connection to facilitate handling of the load.

---

This invention relates to a loading balancer and, more particularly, a loading balancer having improved mechanism facilitating the use of the loading balancer in certain environments.

An object of this invention is to provide a new and improved loading balancer which enables use of the balancer around obstructions which would otherwise prevent delivering of the work held by the balancer to a desired location.

Another object of the invention is to provide a loading balancer in which a work support arm forms one arm of a parallelogram linkage, with means associated with the linkage to counterbalance the weight of a work load carried by the balancer and with the work supporting arm constructed to facilitate handling of a load by the balancer, so as to present the load in different directions in a manner which can avoid obstructions.

A further object of the invention is to provide a loading balancer, as defined in the preceding paragraph, in which the load supporting arm is formed of two parts interconnected by a swivel connection having its pivot axis in line with the pivotal connections of the load support arm to the connecting arms of the parallelogram linkage whereby the lower part of the arm can be rotated without destroying the balance of the load which enables presenting the load in a desired direction and wherein the arm can have a bend therein to avoid obstructions while still not retaining the alignment of pivots and work support point of the load to not affect the balanced condition of the loading balancer.

Further objects and advantages will become apparent from the following detailed description taken in connection with the accompanying drawings in which:

FIG. 1 is a side elevational view of the loading balancer shown as supported by an overhead trolley and supporting a load shown in broken line;

FIG. 2 is a plan detailed view of the work holding fixture shown in FIG. 1 and with a workpiece shown in broken line;

FIG. 3 is a vertical section on an enlarged scale taken generally along the line 3—3 in FIG. 1; and FIG. 4 is an enlarged sectional view, taken generally along the line 4—4 in FIG. 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be ponted out in the appended claims.

Loading balancers are generally well known and are shown in patents owned by the assignee of this application, for example, Patents Nos. 3,259,351 and 3,259,352. The construction of the loading balancer is shown in FIG. 1 in sufficient detail for an understanding of the invention disclosed and, for a more detailed description thereof, reference may be had to the aforesaid patents.

As shown in FIG. 1, as an example, the balancer can be supported from an overhead track 10 by means of a trolley 11 having supporting wheels 12 and 13 engaged with the track. A hanger 14 depends from the trolley 11 and has a pair of spaced depending arms 15 and 16, shown particularly in FIG. 3, which are each formed of a pair of spaced-apart plates. A mounting bracket 20 extends from a location between the upper ends of the arms 15 and 16 to mount, pivotally, a fluid cylinder 21 having a piston rod 22 connected by a pin 23 to a pair of spaced-apart side plates 24 and 25, with the pin 23 extending transversely therebetween. The degree of extension of the piston rod 22 from the cylinder 21 determines the elevation of the side plates 24 and 25 relative to the hanger arms 15 and 16 and thereby the angle of the parallelogram linkage to be described. The plates 24 and 25 are guided for up and down movement and resultantly guide the piston rod 22 by means of an upper set of rollers 30 and 31 and a lower set of rollers 32 and 33 which travel in elongate guide slots 34 and 35 in the side plates 24 and 25, respectively. The rollers 30 and 32 are associated with the guide slot 34, while the rollers 31 and 33 are associated with the guide slot 35. These rollers are all fixedly mounted on the hanger arms 15 and 16, as shown in FIG. 3, with the upper pair of rollers 30 and 31 being rotatably mounted on pins 40 and 41 connected to the hanger arms 15 and 16, respectively, and the rollers 32 and 33 are rotatably mounted on a pin 42 extending through the lower ends of the hanger arms.

The loading balancer assembly includes a first tubular arm 50 pivotally connected by a pivot pin 51 to the hanger arms 15 and 16. This first arm carries a counterweight 52 at one end and, at the other end, has a pivot connection at 53 to a second arm, which is the work-supporting arm indicated generally at 54. A third arm 55 extends parallel to the first arm 50 and is pivotally connected at 56 to the second arm 54. The opposite end of the arm 55 rotatably mounts a follower shaft 56 having rollers 57 and 58 at opposite ends thereof and spaced beyond the arm 55 which engage in tracks 59 and 60 extending generally horizontally in the side plates 24 and 25, as shown in FIGS. 1 and 4. With this construction, force exerted on the side plates 24 and 25 by the fluid cylinder 21 is transmitted to the third arm 55 of the parallelogram linkage through the tracks 59 and 60 engaging rollers 57 and 58, respectively. This force applied to the follower shaft 56 is transmitted through a fourth arm of the parallelogram linkage to the first arm 50. This fourth arm is particularly shown in FIG. 4 and comprises a pair of spaced links 65 and 66 having a tubular section at their lower ends to receive the follower shaft 56 and at their upper ends carrying a link pin 67 extending through the first arm 50 and rotatable relative thereto by means of a bearing 68 mounting the arm 50 on the link pin 67.

The work support arm 54 carries a work-holding fixture 70 at its lower end having a pair of workpiece-engaging members 71 and 72 for engaging a workpiece 73, shown in broken line. The fixture 70 is pivotally mounted at 74 to the lower extremity of the work-support arm 54. Other fixtures, including a swivel hook, could be used.

As described in the aforesaid previous patents, a load held by fixture 70 can be balanced to provide for easy manual manipulation thereof by controlling the amount of force applied to the cylinder 21 which, because of the construction including the parallelogram linkage, will cause constant balancing of the load in any of the range of positions for the loading balancer.

A feature of this invention is to provide further improved operation of a loading balancer to increase the utilization thereof wherein the first work-support arm 54 is formed of two parts with an upper part 80 having the pivot connections 53 and 56 to the first arm 50 and third arm 55 and a lower part 81 carrying the pivot connection 74 for the work fixture 70. The lower part 81 has a bend therein, as shown in FIG. 1, to permit positioning of the lower arm part 81 relative to an obstruction such as, for example, placing the workpiece underneath an overhang as a head of a machine tool or a table. The workload is balanced, at all times, because the pivot connection 74 for the work fixture lies in a straight line defined by the pivot connections 53 and 56. It will be obvious that other shapes can be applied to the lower arm part 81, such as an arc of a circle, with the balancer still working so long as the pivot connection 74 for the fixture 70 lies on the straight line defined by the parallelogram pivot connections 53 and 56.

Further facilitating the use and versatility of the loading balancer is the pivotal connection together of the two parts of the work-supporting arms 54, with the upper part 80 connected to the lower part 81 by way of a swivel connection 82 comprised of a bolt defining a pivot axis, with the axis lying on the aforesaid straight line defined by the pivotal connections 53 and 56 for the parallelogram linkage. It will thus be apparent that the arm lower part 81 can be rotated 360° in order to avoid obstructions while still not changing the balancing action, because at all times the pivot connection 74 for the fixture remains on the line defined by pivot connections 53 and 56.

There has thus been disclosed herein an improved loading balancer assembly in which the versatility of the device has been increased in handling of work around machine tools and other devices in which a workpiece must be placed beneath an overhanging structure. Access for the work is also increased by providing for 360° rotation of the work-support arm and fixture supporting the work without destroying the balancing forces in existence at that time.

I claim:

1. A loading balancer assembly comprising a mount having a base member and a pair of spaced generally vertical arms connected thereto; a generally horizontal first arm pivotally mounted between said arms for rotation about a horizontal axis; a generally vertical second arm adapted to receive a load to be hoisted and balanced by said assembly, said second arm being pivotally connected to one end of said first arm; a third arm pivotally connected to said second arm; and a fourth arm pivotally connected at one end to said first arm and at its other end to said third arm, said arms between said pivotal connections forming a parallelogram; a counterweight operatively connected to one of said arms; means for applying a generally vertical force to said third arm, said means comprising a fluid-actuated piston, a cylinder in which said piston is reciprocable, said cylinder being attached to said mount, the piston being attached to said third arm by means permitting relative horizontal movement therebetween, said latter means comprising a pair of spaced apart plates extending adjacent said vertical arms, a first pair of guide slots one in each of said plates to each receive one of a pair of guide rollers carried by said fourth arm; means for guiding said plates and piston for straight-line movement including a second pair of guide slots one in each of said plates, and upper and lower sets of guide rollers on said vertical arms positioned in said guide slots; said second arm having a work holding member at the lower end thereof; a pivot device connecting said member to said arm and lying on a line including the pivotal connections of said second arm to the first and third arms; a bend in said second arm intermediate the pivot device and the last mentioned pivotal connections to permit handling of a workpiece beneath an obstruction; and said second arm being formed of two parts with a swivel connection therebetween having its pivot aligned with said aforesaid line which includes the pivotal connections.

References Cited

UNITED STATES PATENTS

| | | | |
|---|---|---|---|
| 1,804,266 | 5/1931 | Moore | 294—67.1 |
| 3,259,351 | 7/1966 | Olsen | 248—325 |
| 3,259,352 | 7/1966 | Olsen | 248—325 |

ROY D. FRAZIER, *Primary Examiner.*

J. F. FOSS, *Assistant Examiner.*